United States Patent [19]

Rasmussen et al.

[11] Patent Number: 4,749,845
[45] Date of Patent: Jun. 7, 1988

[54] ELECTRICALLY CONDUCTIVE SILICONE CARBIDE HEATING UNIT

[75] Inventors: Hilmar Ø. Rasmussen; Jørgen H. Petersen, both of Nordborg; Ove S. Boe, Sønderborg; Peter J. M. Clausen, Nordborg, all of

[73] Assignee: Danfoss A/S, Nordborg, Denmark

[21] Appl. No.: 61,162

[22] Filed: Jun. 12, 1987

Related U.S. Application Data

[60] Division of Ser. No. 936,933, Nov. 28, 1986, Pat. No. 4,687,893, which is a continuation of Ser. No. 735,582, May 20, 1985, abandoned.

[30] Foreign Application Priority Data

May 23, 1984 [DE] Fed. Rep. of Germany ....... 3419125

[51] Int. Cl.⁴ .............................................. H05B 3/10
[52] U.S. Cl. ................. 219/553; 219/85 A; 219/541; 431/208
[58] Field of Search ................ 219/85 A, 85 H, 85 F, 219/85 R, 9.5, 553, 552, 541, 542, 543, 544, 538, 539; 431/208

[56] References Cited

U.S. PATENT DOCUMENTS

| | | | |
|---|---|---|---|
| 4,091,267 | 5/1978 | Grant | 219/544 |
| 4,472,133 | 9/1984 | Petersen et al. | 431/208 |
| 4,497,625 | 2/1985 | Petersen et al. | 431/208 |

*Primary Examiner*—Philip H. Leung
*Attorney, Agent, or Firm*—Wayne B. Easton; Clayton R. Johnson

[57] ABSTRACT

This invention relates to an electrically conductive silicon carbide heating unit that includes an axially elongated, silicon carbide tubular heating element which is electrically conductive. The heating element is provided with an annular flange that has an axial bore into which the electrode is extended. Silicon solder fills the gap in the bore, extends somewhat outwardly of the flange to provide a protective layer and provide a good electrical connection between the heater element and the electrode. A stainless steel sleeve is provided on the electrode to extend outwardly from the silicon solder.

4 Claims, 1 Drawing Sheet

ELECTRICALLY CONDUCTIVE SILICONE CARBIDE HEATING UNIT

This application is a division of application Ser. No. 936,933, filed Nov. 28, 1986, now U.S. Pat. No. 4,687,893, which is a continuation of application Ser. No. 735,582, filed May 20, 1985, now abandoned.

The invention relates to a method of soldering a metal electrode to an electrically conducted silicon carbide ceramic element, particularly a heating element, by means of silicon liquified by a heating process, and to a silicon carbide ceramic element having a metal electrode soldered on with silicon and made by said method.

Unpublished German patent application P No. 3243397.2 discloses a fuel preparing element of which the preparation chamber consists at least partially of a ceramic tube which simultaneously serves as a heating element. For this purpose, two annular metal electrodes are provided for connecting the leads and they consist of a material which has substantially the same coefficient of thermal expansion as does the silicon carbide, i.e. for example tungston or molybdenum. These annular metal electrodes are soldered with silicon either to the periphery of the tube or to the end of a silicon carbide annular flange carried by the tube.

By using silicon as the solder, one obtains a good electrical connection between the metal electrode and the silicon carbide ceramic element with a very low transition resistance. For this reason, it is possible to transmit a large amount of electric energy, as is necessary in the case of heating elements. By having the coefficents of thermal expansion roughly equal, one avoids mechanical stresses caused by temperature changes.

The invention is based on the problem of providing a soldering method of the aforementioned kind with which the life of the electrode arrangement is increased, even if it is subjected to high thermal stresses in use.

According to the invention, this problem is solved in that only partial heating of the ceramic element is effected, and is terminated after the silicon has melted.

Liquid silicon reacts with the metal of the electrode very intensively to form metal silicides. This material is brittle and tends to affect the durability of the soldered joint. According to the invention, however, only few metal silicides can be formed because liquid silicon that reacts readily is present only during a short period. This is because heating is terminated again very soon after melting of the silicon has taken place. Since heating was only partial, the heated zone can very readily cool off again by dissipating heat to the unheated zone, so that the temperature of the silicon can very rapidly drop below the melting point again.

Partial heating must take place until a film of the liquid silicon has covered an adequate portion of the contacting faces between the metal electrode and the ceramic element, preferably the entire contacting faces. The larger the area of the metal electrode covered by liquid silicon, the better it will be because the silicon at the same time forms a corrosion protective layer. However, one should try not to keep the silicon liquid for very much longer than is necessary to distribute it. Desirably, the heating times are less than a few seconds, preferably under 10 or even under 5 seconds.

It is particularly favourable if the partial heating takes place by means of high frequency. In this way, heating can be effectively concentrated to the desired area without affecting the rest of the ceramic element.

If the metal electrode is soldered to a silicon carbide annular flange of a tubular or rod-shaped silicon carbide ceramic element, heating should be limited to the zone of the annular flange. Thus for heating purposes a high frequency coil may be disposed about the anular flange with a axial length substantially corresponding to that of the annular flange.

It is also desirable to bring the silicon to the region of the soldering point before the heating step. The heating period will be particularly short and can be very accurately set.

The silicon may be applied as a powder or as a paste, i.e. powder mixed with water, wax and/or some other material. In order that the silicon is not blown away or removed in some other manner during the heating step, the heating apparatus must not exert elevated forces on the silicon. In other words, it must either work with still air, as in high frequency heating, or a wall has to be provided which protects the applied silicon.

In a preferred example, the electrode is introduced in a hole in the ceramic member, silicon is applied to the surface of the ceramic member in the region where the electrode is led out, and heating thereafter takes place so that the melted silicon penetrates into the gap between the hole and the electrode. The gap is very rapidly filled with liquid silicon. This is so even in the case of a narrow gap, because the capillary effect enhances flow. Consequently, the electrode is surrounded by a silicon layer at least over the portion disposed in the hole but in most cases also beyond this, thereby preventing corrosion of the electrode during operation.

The part of the electrode projecting from the hole can be at least partially covered with a corrosion-resistant protective sleeve. This also protects the exposed part of the electrode against corrosion.

Desirably, soldering is performed in a protective gas. By keeping oxygen remote during soldering, all kinds of oxidation reactions are avoided to result in a still better soldered joint. Suitable protective gasses are nitrogen, hydrogen, argon etc.

A silicon carbide ceramic element made by the method is characterised in accordance with the invention in that the metal electrode is provided with a corrosion-resistant protective covering at least over the larger part of the surface disposed beyond the soldering position. In this way, the metal electrode is protected in the zone of the soldering position by the silicon layer and beyond same by the protective covering, in both cases against corrosion of the kind occurring under the influence of the oxygen in the air at high operating temperatures.

Preferably, the electrode is rod-shaped, inserted in a hole in the ceramic element, and there soldered tight by means of silicon, the projecting electrode portion being covered with a protective sleeve. Corrosion protection is therefore afforded within the hole by the silicon layer and beyond the hole by the protective sleeve.

The exposed surface section of the electrode between the ceramic element and the protective sleeve should be provided with a protective layer of silicon. This can be very simply produced in that the silicon is applied to the ceramic element at the mouth of the hole before soldering.

The protective sleeve preferably consists of stainless steel. In particular, it may be connected with the aid of hard solder. This results in a simple and cheap construction.

In a further development, the protective covering may project axially beyond the electrode and receive the lead. This double function of the protective covering facilitates a particularly simple application of the lead.

The lead may likewise be secured by hard solder in the protective covering. However, instead of hard soldering, other securing methods are also possible, for example welding.

The aforementioned reference to silicon carbide ceramic elements is intended to include those silicon carbide ceramic elements which have been additionally saturated with silicon. Nor do they exclude doping substances giving the ceramic material a temperature-dependent resistance characteristic.

A preferred example of the invention will now be described in more detail with reference to the drawing, wherein.

Figure 1:
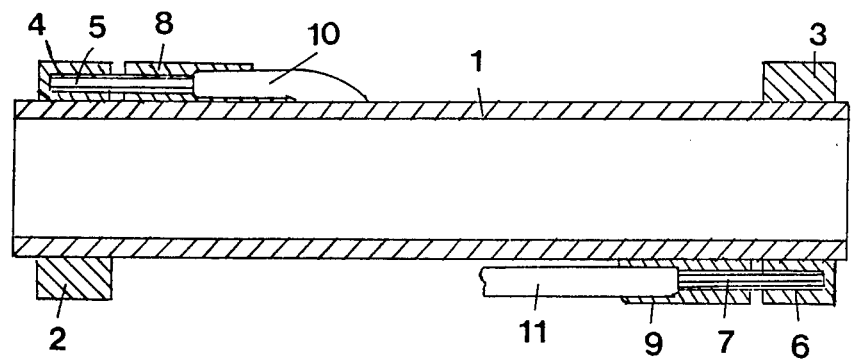
FIG. 1 is a longitudinal section through a silicon carbide ceramic element according to the invention.

FIG. 1 shows a tubular ceramic element 1 of silicon carbide provided at both ends with a respective annular flange 2 and 3 which likewise consists of silicon carbide. The parts 1 to 3 are for example assembled prior to sintering and unified by sintering. They could also be assemblied after sintering and then, with the addition of liquid silicon, made integral to eath other. Such a tube can, especially when incorporating still further ceramic sections, be used as vaporisation burners as explained in prior Application No. P No. 32 43 397.2.

The annular flange 2 has an axial hole 4 in which a pin-shaped metal electrode 5 is secured. The annular flange 3 contains an axial hole 6 in which a pin-shaped metal electrode 7 is held. The metal electrodes consist of a metal having a coefficient of thermal expansion substantially equal to that of silicon carbide, i.e. for example molybdenum or tungsten. Both metal electrodes carry on the outside a respective protective sleeve 8 or 9 of stainless steel that also serves to secure a lead 10 or 11.

Figure 2:
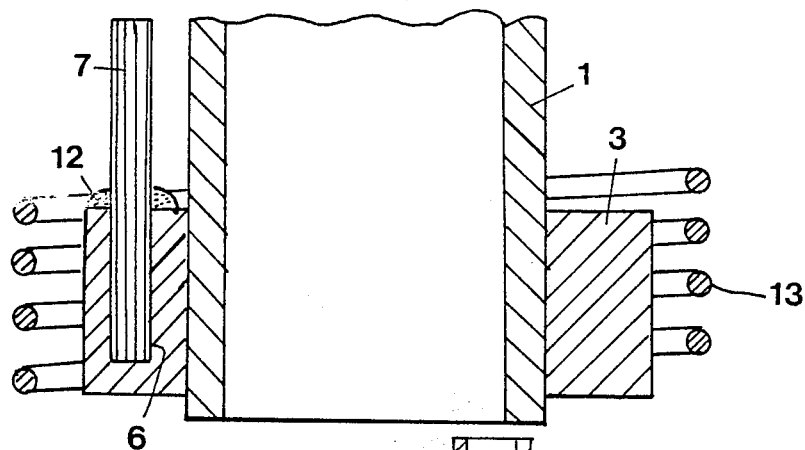
FIG. 2 is a partial longitudinal section through the ceramic element immediately prior to soldering.

Manufacture takes place as follows. According to FIG. 2, the pin-shaped metal electrode 7 is inserted in the hole 6. At the mouth of the hole, an accumulation 12 of silicon powder or paste is provided around the electrode. A coil 13 with an axial length approximately the same as that of the annular flange 3 is arranged around the annular flange 3. Subsequently, the coil 13 is fed with high frequency current so that the zone of the annular flange is heated to a temperature at which the silicon in the accumulation 12 melts.

Figure 3:
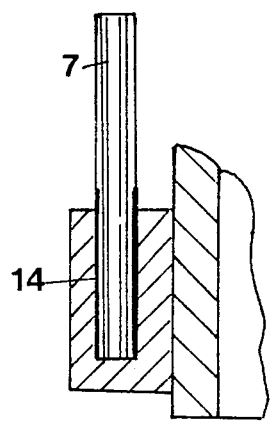
FIG. 3 is a partial section through the soldered zone after the soldering step.
Figure 4:
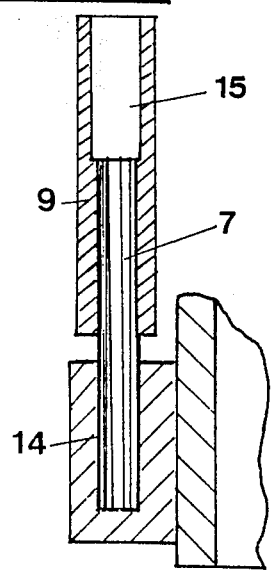
FIG. 4 is a partial longitudinal section through the soldered zone after the application of the protective sleeve.

The liquid silicon coats the electrode 7 in the region of the accumulation 12 and penetrates into the gap between the electrode 7 and hole 6. The capillary effect can assist this. In this way, one obtains the silicon protective layer 14 which is shown in FIG. 3 and which surrounds the electrode 7 in the entire zone of the hole and somewhat beyond same. The coil current is switched off shortly after the silicon has melted. Since the ceramic element is only partially heated, the soldered zone cools off very quickly so that the silicon solidifies rapidly. Since the silicon will react with the metal of the electrode 7 only in the liquid state, only few harmful metal silicides can be formed.

To ensure that the remaining part of the metal electrode 7 is also protected against corrosion, the protective sleeve 9 of stainless steel is applied and secured, for example, by means of hard solder. It is pushed so far over the electrode 7 that it reaches up to the upper rim of the silicon protective layer 14 or even projects beyond same. In this way, one ensures that the metal electrode 7 will not corrode even under high temperature conditions such as those encountered in a vaporisation burner nor under the influence of oxygen in the air. The protective sleeve 9 has a depression 15 into which a lead 11 can be pushed. Fastening can likewise be effected by means of hard solder.

The soldered joints so produced are suitable not only for heating elements of silicon carbide but also for other applications, for example ignition electrodes or ionisation measuring electrodes.

We claim:

1. An electrically conductive silicon carbide heating unit, comprising, an axially elongated tubular ceramic heating element made of silicon carbide; a flange made of silicon carbide and joined to said heating element to extend radially outwardly relative thereto, said flange having an axially extending bore, an elongated electrode having a first end portion located in said bore, an intermediate portion and an opposite second end portion, the electrode first end portion being of a smaller diameter than the bore to provide a gap in the bore between the electrode first end portion and the flange, silicon solder securing the electrode first end portion to the flange to provide a good electrical connection between said flange and electrode, said silicon solder filling said gap and extending somewhat outwardly of the flange to provide a protective layer on the electrode first end portion and the adjacent intermediate portion, and a protective sleeve on the electrode that extends from the protective layer and outwardly from the flange, the protective sleeve being of a material that is corrosion resistant and will protect the electrode against corrosion under high temperature such as in a vaporization burner.

2. The silicon carbide heating unit of claim 1, characterized in that the flange is annular and surrounds the heating element.

3. The silicon carbide heating unit of claim 1, characterized in that said sleeve is made of stainless steel.

4. The silicon carbide heating unit of claim 1, characterized in that the electrode is made of a metal having a coefficient of thermal expansion substantially equal to that of silicon carbide.

* * * * *